(12) United States Patent
Tsuge et al.

(10) Patent No.: US 9,835,153 B2
(45) Date of Patent: Dec. 5, 2017

(54) VARIABLE DISPLACEMENT OIL PUMP

(71) Applicants: Noriyuki Tsuge, Toyota (JP); Noboru Takagi, Toyota (JP); Shinichiro Ito, Toyota (JP); Yuki Nishida, Anjo (JP); Hisashi Ono, Okazaki (JP)

(72) Inventors: Noriyuki Tsuge, Toyota (JP); Noboru Takagi, Toyota (JP); Shinichiro Ito, Toyota (JP); Yuki Nishida, Anjo (JP); Hisashi Ono, Okazaki (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 0 days.

(21) Appl. No.: 14/436,629

(22) PCT Filed: Jan. 16, 2014

(86) PCT No.: PCT/IB2014/000042
§ 371 (c)(1),
(2) Date: Apr. 17, 2015

(87) PCT Pub. No.: WO2014/111798
PCT Pub. Date: Jul. 24, 2014

(65) Prior Publication Data
US 2015/0285246 A1    Oct. 8, 2015

(30) Foreign Application Priority Data

Jan. 21, 2013   (JP) .................................. 2013-008601

(51) Int. Cl.
*F04C 14/22*      (2006.01)
*F04C 2/344*     (2006.01)
(Continued)

(52) U.S. Cl.
CPC .......... *F04C 14/22* (2013.01); *F01C 21/0863* (2013.01); *F04C 2/086* (2013.01);
(Continued)

(58) Field of Classification Search
CPC .. F16H 47/04; F04C 2/102; F04C 2/10; F04C 14/226; F04C 14/223; F04C 2/3442;
(Continued)

(56) References Cited

U.S. PATENT DOCUMENTS

2008/0118372 A1   5/2008  Hoshina et al.
2009/0092504 A1*  4/2009  Akashi ............... F04B 39/0253
                                                                  417/368
(Continued)

FOREIGN PATENT DOCUMENTS

CN        101978167 A    2/2011
JP        2008-128024 A  6/2008
JP        2012-132356 A  7/2012

OTHER PUBLICATIONS

International Search Report dated Mar. 27, 2014 in PCT/IB2014/000042 filed Jan. 16, 2014.

*Primary Examiner* — Mark Laurenzi
*Assistant Examiner* — Wesley Harris
(74) *Attorney, Agent, or Firm* — Oblon, McClelland, Maier & Neustadt, L.L.P.

(57) ABSTRACT

A variable displacement oil pump includes: a variable displacement mechanism that is able to change a discharge amount per rotation of an input shaft. The variable displacement mechanism includes a pump housing, an oil pressure chamber provided in the pump housing, and a capacity adjustment member displaced by oil pressure from the oil pressure chamber. The capacity adjustment member is configured to be operated when receiving control oil pressure that is supplied from a control valve to the oil pressure chamber. The pump housing has an oil release hole that is opened to face the oil pressure chamber and that penetrates a wall section of the pump housing to partially release oil.

10 Claims, 7 Drawing Sheets (51) Int. Cl.
   *F01C 21/08* (2006.01)
   *F16H 47/04* (2006.01)
   *F04C 2/10* (2006.01)
   *F04C 14/14* (2006.01)
   *F04C 14/10* (2006.01)
   *F04C 2/08* (2006.01)
   *F04C 14/26* (2006.01)
(52) U.S. Cl.
   CPC ............... *F04C 2/10* (2013.01); *F04C 2/102* (2013.01); *F04C 2/3442* (2013.01); *F04C 14/10* (2013.01); *F04C 14/14* (2013.01); *F04C 14/223* (2013.01); *F04C 14/226* (2013.01); *F04C 14/26* (2013.01); *F16H 47/04* (2013.01)
(58) Field of Classification Search
   CPC .......... F04C 14/22; F04C 14/10; F04C 14/14; F01C 21/0863
   See application file for complete search history.

(56) References Cited

U.S. PATENT DOCUMENTS

2010/0054977 A1* 3/2010 Chiu ................. F04C 14/22
                                                418/26
2011/0014078 A1* 1/2011 Ono ................. F04C 2/086
                                                418/166

* cited by examiner

VARIABLE DISPLACEMENT OIL PUMP

BACKGROUND OF THE INVENTION

1. Field of the Invention

The present invention relates to a variable displacement oil pump and in particular relates to a variable displacement oil pump in which a control oil pressure supplied to a variable displacement mechanism is regulated by a control valve of an electronic control type.

2. Description of Related Art

As an oil pump of an engine, Japanese Patent Application Publication No. 2012-132356 (JP 2012-132356 A) discloses an internal gear oil pump in which an oil suctioned from a suction port is discharged to a discharge port by rotation of an inner rotor (drive rotor) and an outer rotor (driven rotor) that mesh with each other.

The above oil pump includes an adjustment ring that holds the outer rotor from a circumference in a rotatable manner in the housing, and, when the adjustment ring is displaced by receiving oil pressure that is led to a pressurizing space in the housing, relative positions of the inner rotor and the outer rotor to the suction port and the discharge port are changed. Accordingly, it is possible to change a discharge amount (a so-called displacement, and may hereinafter be referred to as a pump capacity) per rotation of an input shaft.

In addition, as disclosed in the paragraphs 0043 to 0047 (another embodiment) as well as FIGS. 3 and 4 of the same document, a control space (oil pressure chamber) is provided adjacent to the pressurizing space in the housing, and control oil pressure is regulated and supplied to the control space from a control valve of an electronic control type to generate a force to assist in displacing the adjustment ring as described above.

SUMMARY OF THE INVENTION

However, like another embodiment described above, even when the oil pressure of the control space is regulated by the control valve of the electronic control type to adjust a magnitude of the force to displace the adjustment ring, there is a case where discharge pressure from the oil pump deviates from a target value. Therefore, there is room for improving controllability of the discharge pressure and the like by controlling the pump capacity.

In other words, when the displacement of the adjustment ring is increased by increasing current to the control valve along with an increase in engine speed and also by increasing the control oil pressure to be supplied in order to suppress an excessive increase in the discharge pressure, for example, there is a case where the pump discharge pressure is abruptly reduced during the increase of the current and thus the discharge pressure cannot be controlled to the target pressure.

As a result of experiments and earnest investigations into a cause of such an abrupt change in the discharge pressure, the inventors have found that the oil leaked from the pressurizing space, a pump operation chamber, or the like, for example, enters the control space in the housing to which the control oil pressure is supplied and that the oil pressure is abruptly changed under the influence of the leaked oil. Accordingly, the adjustment ring is abruptly displaced.

The present invention provides a variable displacement oil pump that is installed in an engine, for example, and that can improve controllability when a variable displacement mechanism is operated by control oil pressure that is supplied from a control valve.

In the present invention, a small hole that releases the oil pressure from the control space (oil pressure chamber) in the housing of the oil pump is provided to suitably leak the entered oil. Accordingly, an abrupt change in the oil pressure can be suppressed.

More specifically, a variable displacement oil pump according to one aspect of the present invention includes: a variable displacement mechanism that is able to change a discharge amount per rotation of an input shaft. The variable displacement mechanism includes a pump housing, an oil pressure chamber provided in the pump housing, and a capacity adjuster structure that is displaced by oil pressure from the oil pressure chamber. The capacity adjuster structure is configured to be operated when receiving control oil pressure that is supplied from a control valve to the oil pressure chamber. The pump housing has an oil release hole that is opened to face the oil pressure chamber and penetrates a wall section of the pump housing to partially release oil.

In the oil pump according to the above aspect, discharge pressure as well as a discharge flow rate tends to increase along with an increase in a rotational speed of the input shaft. However, because the oil pressure of the oil pressure chamber in the pump housing is regulated by the control valve, and the variable displacement mechanism is then operated to reduce the discharge amount (pump capacity) per rotation of the input shaft, it is possible to suppress the increase in the discharge pressure.

Here, if the control oil pressure from the control valve is increased under a circumference where the discharge pressure shows a tendency to increase as described above, there is a possibility that the oil pressure of the oil pressure chamber is abruptly increased due to the influence of the oil that enters the oil pressure chamber from the discharge port, a pump operation chamber, or the like, for example. However, according to the above aspect, because the oil is partially released from the oil release hole that is opened to face the oil pressure chamber, it is possible to suppress the abrupt change in the oil pressure.

Accordingly, it is possible to suppress an abrupt operation of the adjustment ring that can be caused by the abrupt change in the oil pressure of the oil pressure chamber and thus to improve controllability of the discharge amount and the discharge pressure. When the oil pump is installed in the engine, the controllability of the oil pressure in a main gallery of the engine is improved, and thus the oil pump can contributes to maintenance of favorable lubrication performance.

In the above aspect, a high-pressure space to which the pump discharge pressure is led may be provided inside the pump housing and adjacent to the oil pressure chamber, and a sealing section between the high-pressure space and the oil pressure chamber may move along an inner surface of the wall section of the pump housing along with an operation of the variable displacement mechanism.

In this case, the sealing section between the high-pressure space and the oil pressure chamber is structured to move along the wall section of the housing. Accordingly, the oil can easily enter the oil pressure chamber from the high-pressure space adjacent thereto via the sealing section. Therefore, an effect of the invention in which the problem is suppressed by partially leaking the oil from the oil pressure chamber as described above becomes particularly beneficial.

Various structures of the oil pump can be considered for the oil pump according to the above aspect, such as a gear pump, a vane pump, a piston pump, and the like. However, the oil pump according to the above aspect may be an internal gear pump, for example, and include a drive rotor of an outer gear that is rotated by the input shaft and a driven rotor of an inner gear that is rotated by meshing with the drive rotor.

In this case, the variable displacement mechanism may include an annular holder structure as the capacity adjuster structure that holds the driven rotor from a circumference in a rotatable manner, and may change the discharge amount by displacing the holder structure when the holder structure receives the control oil pressure supplied to the oil pressure chamber and by changing a relative position of the holder structure to a suction port and a discharge port that are formed in the pump housing.

As described above, when the gear pump is used as the oil pump, an amount of the oil that enters the oil pressure chamber of the variable displacement mechanism from an operation, chamber between the drive rotor and the driven rotor tends to increase. Accordingly, the effect of the invention in which the problem is suppressed by partially leaking the oil from the oil pressure chamber as described above becomes particularly beneficial.

In addition, when the oil pump according to the above aspect is installed in the engine, the oil release hole may be communicated with an oil leading passage so as to lead the oil to a certain lubricated section of the engine. Accordingly, the oil that is leaked from the oil pressure chamber of the oil pump can be used effectively to lubricate the engine.

In this case, a throttle section may be provided in a middle of the oil leading passage. Because the flow rate of the oil that is leaked from the oil release hole can be adjusted by such a configuration, it is possible to reduce an influence of possible fluctuation in the size of the oil release hole during a manufacturing process and thus to set a favorable oil release amount. This becomes beneficial when the controllability of the variable displacement mechanism is improved.

Alternatively, it is possible to supply the oil from the oil release hole to the lubricated section in proximity of the oil pump. For example, if the oil is supplied to a chain for driving the oil pump, the oil release hole may have a tapered shape whose cross section gradually decreases as separating from an opening end that faces the oil pressure chamber. In addition, the oil release hole may be formed such that the oil from the oil release hole is supplied to the lubricated section. Accordingly, it is possible to spray the oil intensively to the chain and the like.

On the other hand, if the oil is supplied to the plural lubricated section in proximity of the oil pump, the oil release hole may have an upwardly widened shape whose cross section gradually increases as separating from the opening end that faces the oil pressure chamber. In addition, the oil release hole may be formed such that the oil from the oil release hole may be supplied to the lubricated sections. Accordingly, it is possible to supply the oil to the plural lubricated sections (not only the chain but a pump sprocket and the like, for example) by splashing the oil from the oil release hole in a wide range.

In the variable displacement oil pump according to the aspect of the present invention, the oil release hole that is opened to face the oil pressure chamber for operating the variable displacement mechanism and that penetrates the wall section of the pump housing is provided to partially leak the oil that enters the oil pressure chamber in an appropriate amount. Accordingly, it is possible to suppress the abrupt operation of the variable displacement mechanism that can be caused by the abrupt change in the oil pressure of the oil pressure chamber and thus to improve the controllability of the discharge amount and the discharge pressure of the oil pump. In addition, when the oil pump is installed in the engine, it is possible to improve the controllability of the oil pressure of the main gallery in the engine and thus to contribute to the maintenance of the favorable lubrication performance.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

A description will hereinafter be made on an embodiment of the present invention with reference to the drawings. Although this embodiment is described in a case where the present invention is adopted for an oil supply system 2 of a four-cylinder gasoline engine 1 for a vehicle, this embodiment is not limited thereto. The description of this embodiment is merely illustrative and thus does not limit a configuration or application of the present invention.

Figure 1:
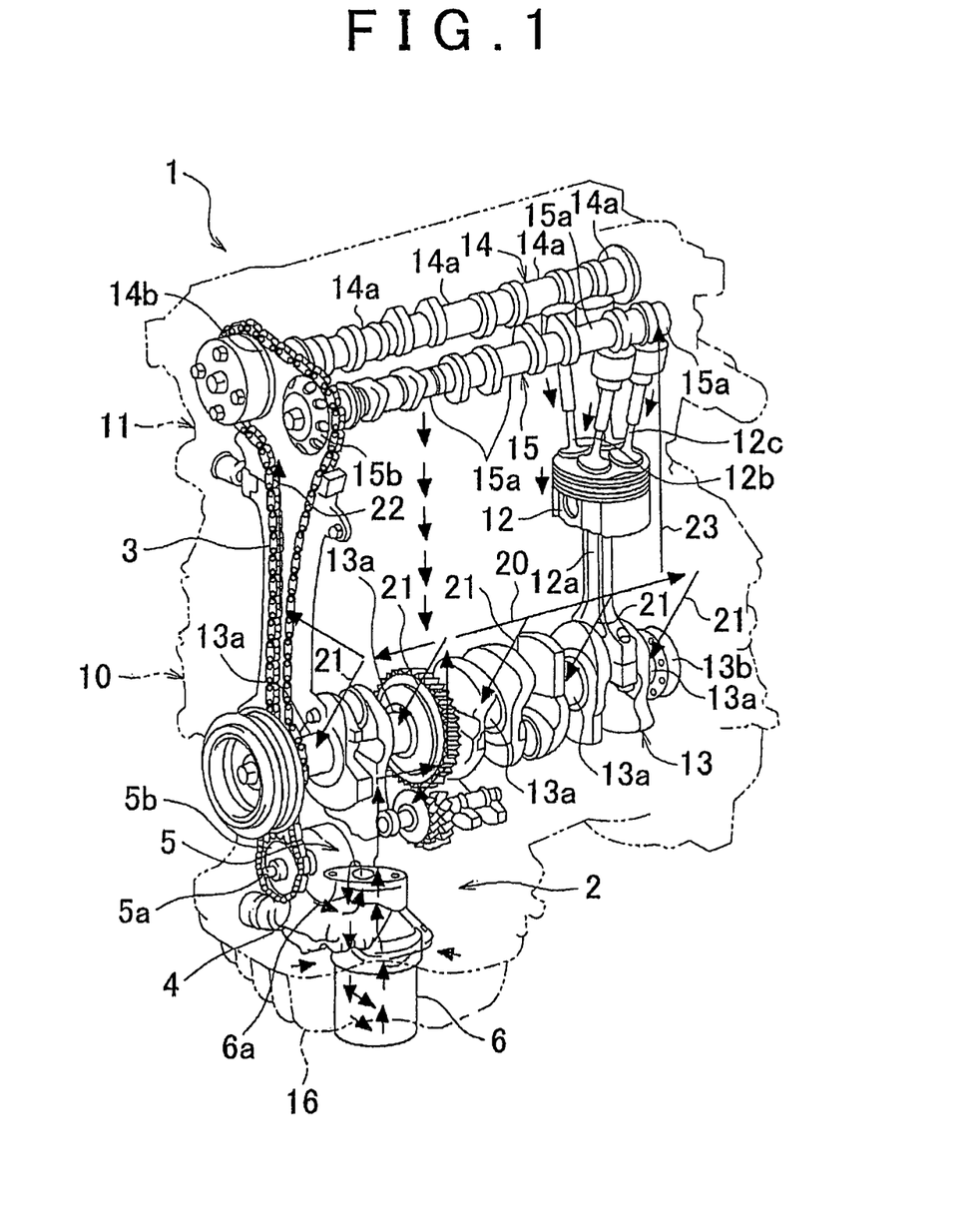
FIG. 1 shows an overall configuration of one example of an oil supply system in an engine according to embodiments of the present invention.

As shown by a phantom line in FIG. 1, the engine 1 is formed by assembling a cylinder head 11 on top of a cylinder block 10. The cylinder block 10 is provided with four cylinders (not shown), and a piston 12 (only one is shown in the drawing) that is housed in each of the cylinders is connected to a crankshaft 13 via a connecting rod 12a. In an example of the drawing, the crankshaft 13 is rotatably supported by five crank journals 13a in a lower section (crankcase) of the cylinder block 10.

Meanwhile, camshafts 14, 15 of a valve system for driving an intake valve 12b and an exhaust valve 12c for the each cylinder are disposed in the cylinder head 11. One example of the valve system is a DOHC type that includes the two camshafts 14, 15 for an intake side and an exhaust side, and the camshafts 14, 15 are rotatably supported at five each of cam journals 14a, 15a by the cylinder head 11 in the example of the drawing.

The two camshafts 14, 15 rotate in synchronization with the crankshaft 13 to open and close the intake valve 12b and the exhaust valve 12c. More specifically, while a crank sprocket (not shown) is attached to a front end of the crankshaft 13 (left end in FIG. 1), cam sprockets 14b, 15b are respectively attached to ends of the two camshafts 14, 15, and a timing chain 3 is wound therearound. Accordingly, the camshafts 14, 15 rotate in synchronization with the crankshaft 13.

In addition, a sprocket (not shown) for driving an oil pump 5 is also attached adjacent to a rear side of the crank sprocket. In other words, the oil pump 5 is located below the front end of the crankshaft 13, a pump sprocket 5b is attached to an input shaft 5a thereof, and a chain 4 is wound between the pump sprocket 5b and the sprocket of the crankshaft 13.

When the input shaft 5a is rotated by a force from the crankshaft 13, an engine oil (hereinafter simply referred to as oil) that is discharged from the oil pump 5 is supplied to lubricated sections such as the piston 12, the crank journal 13a, the cam journals 14a, 15a, and the like via the oil supply system 2. The oil supply system 2 filters the oil that is suctioned from an oil pan 16 by the operation of the oil pump 5 with an oil filter 6 and then supplies the oil to a main gallery 20.

In other words, the oil pump 5 suctions the oil that is reserved in the oil pan 16 via an unillustrated oil strainer, discharges the oil from a discharge port 50e (see FIG. 2), and delivers the oil to the oil filter 6 through a communicating passage 6a. The oil filter 6 filters out foreign substances and impurities in the oil by a filter element that is housed in the housing, and the oil filtered therein is delivered to the main gallery 20.

The main gallery 20 is formed to extend in a cylinder bank direction in the cylinder block 10, for example, and distributes the oil delivered from the oil pump 5 to the lubricated sections and the like through plural branch oil passages 21 to 23. In the example of the drawing, the oil is supplied to the crank journals 13a through the branch oil passages 21 that are branched at equally spaced intervals in a longitudinal direction of the main gallery 20 and extend downward. In addition, the oil is supplied to the cam journals 14a, 15a of the cylinder head 11 and the like by the branch oil passages 22, 23 that extend upward from both ends of the main gallery 20.

Figure 2:
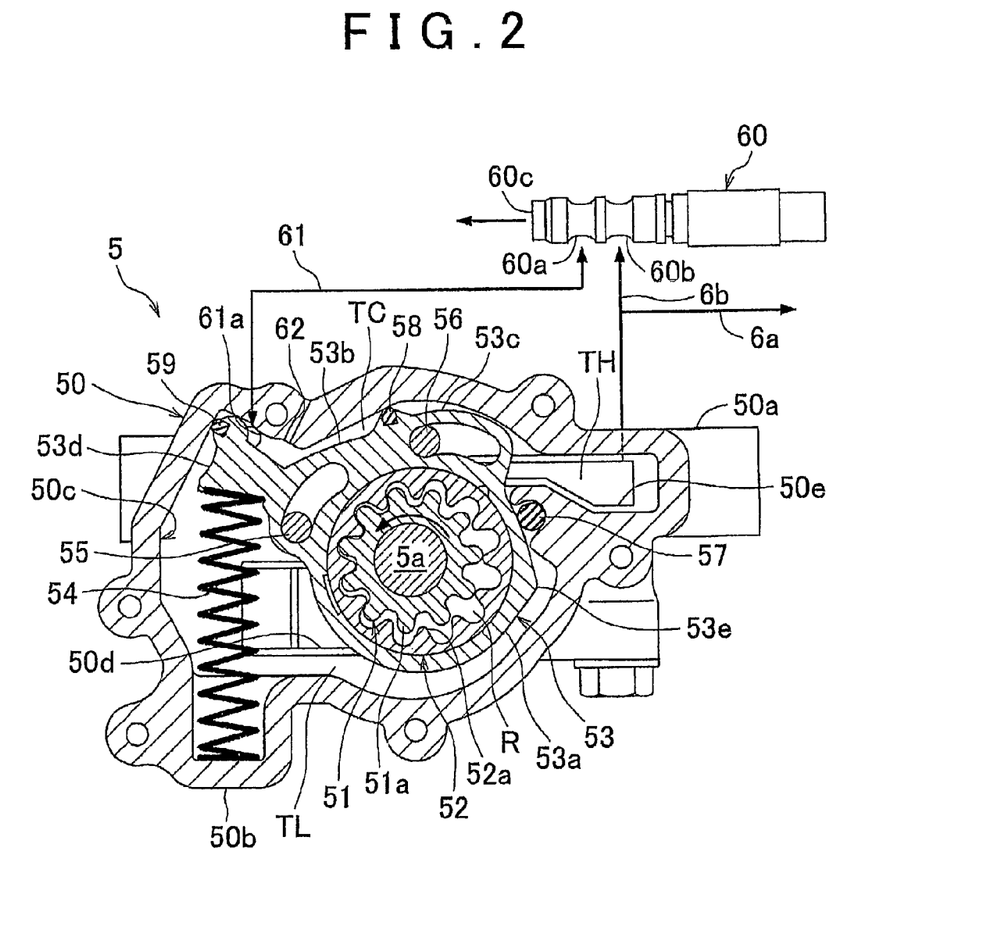
FIG. 2 is a cross-sectional view for showing a structure of an oil pump according to a first embodiment of the present invention and showing a state with a maximum pump capacity.

A detailed description will hereinafter be made on a structure of the oil pump 5 with reference to FIG. 2. FIG. 2 shows a first embodiment, and, in this example, the oil pump 5 houses a drive rotor 51 that is an outer gear rotated by the input shaft 5a, a driven rotor 52 that is an inner gear rotated by meshing with the drive rotor 51, and an adjustment ring 53 (holding member) that holds the driven rotor 52 from a circumference in a rotatable manner in a housing 50 (pump housing). As will be described below, the adjustment ring 53 also serves as a capacity adjustment member that changes a pump capacity by displacing the drive rotor 51 and the driven rotor 52.

The housing 50 is a thick plate as a whole, is in an oval shape that is laterally long in a plan view that is seen from a rear of the engine as shown in FIG. 2, and is formed with a projecting section 50a from an upper right part to the right side of the drawing as well as a projecting section 50b from a lower left part to the lower side of the drawing. In addition, the entire housing 50 is formed with a concave section 50c that is opened to the rear, that is, an inner side (front side in the drawing) of the engine 1.

The concave section 50c houses the drive rotor 51, the driven rotor 52, the adjustment ring 53, and the like (hereinafter referred to as the housing concave section 50c) and is closed by a cover (not shown) that is overlapped with the housing 50 from the rear. In addition, a through hole having a circular cross section (not shown) is formed in a position in the housing concave section 50c that is slightly to the right from the center, and the input shaft 5a that is inserted therethrough projects to the front.

While the pump sprocket 5b around which the chain 4 is wound is attached to the front end of the input shaft 5a that projects to the front of the housing 50, a rear end of the input shaft 5a penetrates a center of the drive rotor 51 and is spline-fitted, for example. The drive rotor 51 is formed on its circumference with plural outer teeth 51a (11 in the example of the drawing) having a trochoid curve or a curve that is similar to the trochoid curve (such as an involute curve or a cycloid curve, for example).

Meanwhile, the driven rotor 52 is formed in an annular shape, and an inner periphery thereof is formed with inner teeth 52a whose number is one more than the outer teeth 51a of the drive rotor 51 (12 in the example of the drawing) so as to mesh therewith. A center of the driven rotor 52 is eccentric with respect to the center of the drive rotor 51 by a predetermined amount, and the outer teeth 51a of the drive rotor 51 mesh with the inner teeth 52a of the driven rotor 52 on an eccentric side (upper left side in FIG. 2).

In addition, the driven rotor 52 is slidably fitted and supported by an annular main body section 53a of the adjustment ring 53. In this example, the adjustment ring 53 is integrally formed with: two bulging sections 53b, 53c that bulge to an outer side in a radial direction for a predetermined angular range in a circumferential direction (approximately 50° in the example of the drawing) from a circumference of the main body section 53a; an arm section 53d that extends long to the outer side in the radial direction; and a small projecting section 53e. The adjustment ring 53 will be described below in detail.

In this embodiment, a trochoid pump having 11 lobes and 12 lobe spaces is configured by the drive rotor 51 and the driven rotor 52 that are held by the adjustment ring 53 as described above, and plural operation chambers R arranged in the circumferential direction are each formed between a pair of meshing teeth in an annular space between the two rotors 51, 52. Each of the operation chambers R increases and reduces its capacity by moving along the circumference of the drive rotor 51 in association with the rotation of the two rotors 51, 52.

In other words, the capacity of the operation chamber R gradually increases along with the rotation of the two rotors 51, 52 in a range of approximately 180° from a position where teeth of the two rotors 51, 52 mesh with each other in a rotor rotational direction that is shown by an arrow in the drawing (a lower left range in FIG. 2), and the range just described functions as a suction range to suction the oil. On the other hand, the capacity of the operation chamber R gradually decreases along with the rotation of the rotors 51, 52 in the rest of the range of approximately 180° (an upper right range in FIG. 2), and the range just described functions as a discharge range to pressurize and discharge the oil.

Then, the housing 50 and the cover are formed with a suction port and an outlet port that respectively correspond to the suction range and the discharge range. Although FIG. 2 only shows the suction port 50d and the discharge port 50e of the housing 50, the suction port 50d is opened at a bottom surface of the housing concave section 50c of the housing 50 to correspond to the suction range, and the discharge port 50e is also opened to correspond to the discharge range.

In the drawing, the suction port 50d is located in the lower left side of the housing 50, communicates with the suction port of the unillustrated cover, and further communicates with a suction pipeline of the oil strainer through the suction port. Meanwhile, the discharge port 50e is located in the upper right side of the housing 50, communicates with the discharge port of the unillustrated cover, extends to the right in the drawing to correspond to the projecting section 50a of the housing 50, and reaches the communicating passage 6a that is led to the oil filter 6.

In the oil pump 5 with such a structure, when the input shaft 5a receives and rotates by the force from the crankshaft 13 that is first transmitted to the pump sprocket 5b, the drive rotor 51 and the driven rotor 52 mesh with each other to rotate, the operation chambers R formed therebetween suction the oil from the suction port 50d, and the oil is pressurized and discharged from the discharge port 50e.

A flow rate of the oil that is discharged as described above increases along with an increase in a rotational speed of the oil pump 5 (rotational speed of the input shaft 5a) that is, engine speed. Accordingly, even if an amount of the oil that is supplied to the lubricated sections such as the crank journal 13a and the like increases in a high speed range of the engine 1, it is possible to maintain an oil pressure of the main gallery 20 to be equal to or higher than a predetermined value and thus to appropriately distribute the oil to the lubricated sections.

The oil pump 5 of this embodiment includes a variable displacement mechanism that can change the amount of the oil discharged per rotation of the drive rotor 51, that is, the pump capacity. In this embodiment, the adjustment ring 53 is mainly displaced by the oil pressure (discharge pressure) that is led from the discharge port 50e, and relative positions of the drive rotor 51 and the driven rotor 52 to the suction port 50d and the discharge port 50e are changed in order to change the flow rate of the oil that is suctioned and discharged per rotation.

More specifically, as shown in FIG. 2, a pressing force from a compression coil spring 54 acts on the arm section 53d of the adjustment ring 53 that extends from the main body section 53a to the outer side in the radial direction. Accordingly, the adjustment ring 53 is urged to be slightly displaced to the above while rotating clockwise in the drawing. During such a displacement, the adjustment ring 53 is guided by guide pins 55, 56.

In other words, the bulging sections 53b, 53c of the adjustment ring 53 are each formed in a curved oval frame shape and respectively house the guide pins 55, 56 that are formed projecting from the bottom surface of the housing concave section 50c in the housing 50. The guide pins 55, 56 respectively contact inner peripheries of the frame-shaped bulging sections 53b, 53c and slide in a longitudinal direction thereof to define a displacement trajectory of the adjustment ring 53.

The adjustment ring 53 that is guided by the guide pins 55, 56 and displaced as described above divides the inside of the housing concave section 50c into a high-pressure space TH in the upper right side of the drawing and a low-pressure space TL in the lower left side thereof, and is operated by receiving the oil pressure of the high-pressure space TH. More specifically, in the housing concave section 50c of the housing, the high-pressure space TH is formed in an area that is surrounded by the circumference of the bulging section 53c of the adjustment ring 53 and a wall section of the housing 50 and in which a flow of the oil is restricted by first and second seal members 57, 58.

An opening of the discharge port 50e partially faces the high-pressure space TH. The discharge pressure of the oil pump 5 is led to the high-pressure space TH and acts on a circumferential surface of the adjustment ring 53. Meanwhile, because an atmospheric pressure generally acts on the low-pressure space TL with which the suction port 50d is communicated, the adjustment ring 53 is urged to rotate counterclockwise in the drawing by the oil pressure from the high-pressure space TH.

As described above, the adjustment ring 53 receives a resilient force of the coil spring 54 that acts on the arm section 53d as described above, thus is urged clockwise, and is mainly displaced by an urging force thereof and the like. When the engine speed is low such as during idling, for example, the adjustment ring 53 is displaced to a maximum displacement position in FIG. 2 by the resilient force of the coil spring 54. At this time, the amount of the oil that is suctioned from the suction port 50d and discharged from the discharge port 50e, that is, the pump capacity per rotation of the drive rotor 51 and the driven rotor 52 becomes maximum.

When the engine speed is increased from this state, the discharge pressure also tends to be increased by an increase in a discharge amount of the oil. Thus, the adjustment ring 53 receives the oil pressure of the high-pressure space TH and is displaced counterclockwise against the resilient force of the coil spring 54. Accordingly, the pump capacity is reduced, and the increase in the discharge amount and the discharge pressure is suppressed even at the high speed. Then, when the adjustment ring 53 is brought to a minimum capacity, position as shown in FIG. 3, the discharge amount per rotation becomes minimum.

Figure 3:
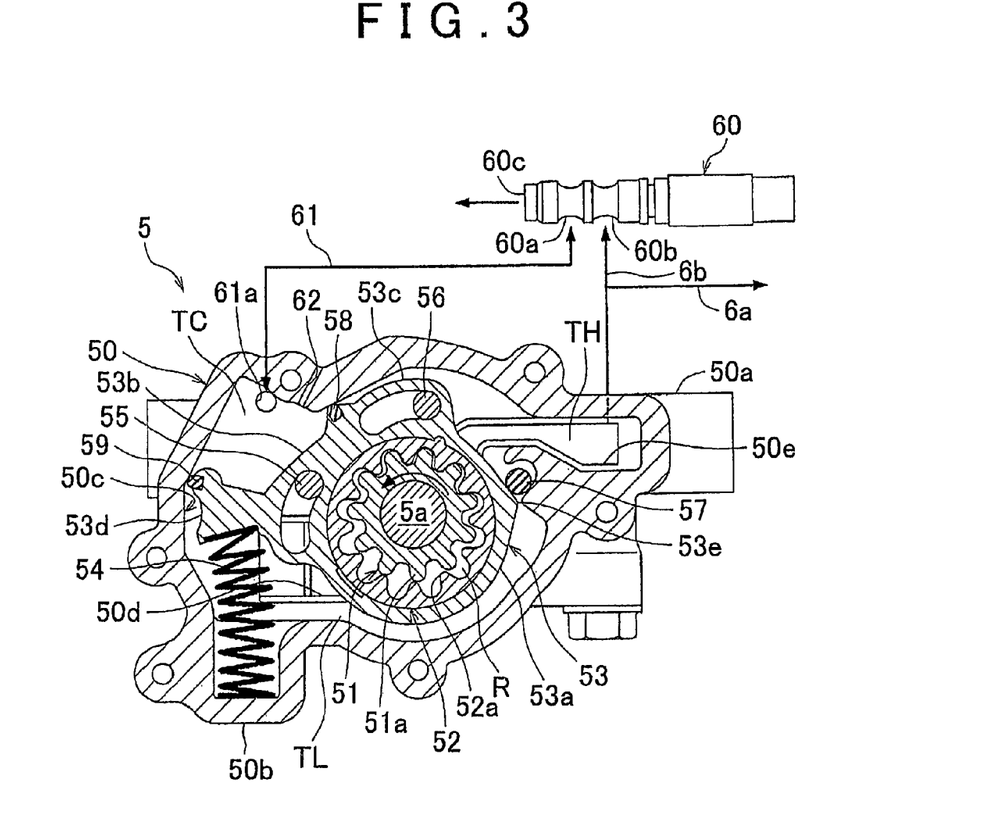
FIG. 3 corresponds to FIG. 2 and shows a state where the capacity of the oil pump is minimum.

Furthermore, in this embodiment, as shown in FIGS. 2 and 3, the housing 50 is provided with a control space TC (oil pressure chamber) that is adjacent to the high-pressure space TH, and a control oil pressure is supplied from a control valve 60 of electronic control type (Oil Control Valve: hereinafter referred to as OCV) to generate a force to assist in displacing the adjustment ring 53 as described above. The OCV 60 can increase controllability of the pump capacity as described above by regulating the control oil pressure with high accuracy and adjusting a magnitude of the force to assist in displacing adjustment ring 53.

More specifically, the second seal member 58 is disposed on the circumference of the adjustment ring 53 at the substantial center of the two bulging sections 53b, 53c and slidably contacts an inner surface of the wall section of the housing 50 that surrounds the housing concave section 50c. The second seal member 58 is a sealing section between the high-pressure space TH and the control space TC and moves along the inner surface of the wall section of the housing 50 along with the displacement of the adjustment ring 53 as described above.

Similarly, a third seal member 59 is disposed at a tip of the arm section 53d of the adjustment ring 53 and slidably contacts the opposing inner surface of the wall section of the housing 50. The second and third seal members 58, 59 as well as the first seal member 57 have a dimension that is comparable to a thickness of the adjustment ring 53 (a dimension in a perpendicular direction to the pages of FIGS. 2 and 3), and are formed of a metal or resinous material with excellent abrasive resistance.

As described above, in the housing concave section 50c of the housing 50, the control space TC is formed in an area that is surrounded by the circumference of the adjustment ring 53 (more specifically, the circumference of the bulging section 53b), the arm section 53d, and the wall section of the housing 50 that opposes the circumference of the adjustment ring 53 and the arm section 53d, and where the flow of the oil is restricted by the second and third seal members 58, 59.

Then, the control oil pressure is supplied from the OCV 60 through a control oil passage 61 that is opened to the bottom surface of the housing concave section 50c in the control space TC.

More specifically, one end of the control oil passage 61 is opened as a circular hole 61a that faces the control space TC while another end thereof is communicated with a control port 60a of the OCV 60. The OCV 60 changes a position of a spool when receiving a signal from an unillustrated controller and switches between a state in which the oil from a supply port 60b is delivered to the control oil passage 61 from the control port 60a and a state in which the oil discharged from the control oil passage 61 is received by the control port 60a and discharged from a drain port 60c.

In addition, in the OCV 60 that is a linear solenoid valve as one example, the position of the spool is continuously changed in response to the signal from the controller, and a pressure of the oil that is delivered from the control port 60a to the control oil passage 61 as described above can be increased or reduced linearly. Accordingly, for example, when the adjustment ring 53 is displaced counterclockwise in FIG. 2 along with the increase in the engine speed as described above, it is possible to assist in displacing the adjustment ring 53 by increasing the control oil pressure that is supplied to the control space TC.

Meanwhile, if the control oil pressure that is supplied to the control space TC is reduced by control of the OCV 60, it is possible to suppress the adjustment ring 53 from being displaced counterclockwise. This can improve the controllability of the pump capacity. It should be noted that, although a branch passage 6b is connected in a middle of the communicating passage 6a from the discharge port 50e of the oil pump 5 to the oil filter 6 so as to supply the oil to the OCV 60 in this embodiment as shown in FIGS. 2 and 3, the present invention is not limited thereto, and the oil filtered by the oil filter 6 may be supplied to the OCV 60, for example.

In a variable displacement oil pump as one in this embodiment, even when an displacement amount of the adjustment ring 53 was controlled by using the OCV 60 of electronic control type as described above, there was a case where a fluctuation in the pump capacity prevented the control of the discharge pressure as intended. A description will hereinafter be made on this problem with reference to FIG. 4.

Figure 4:
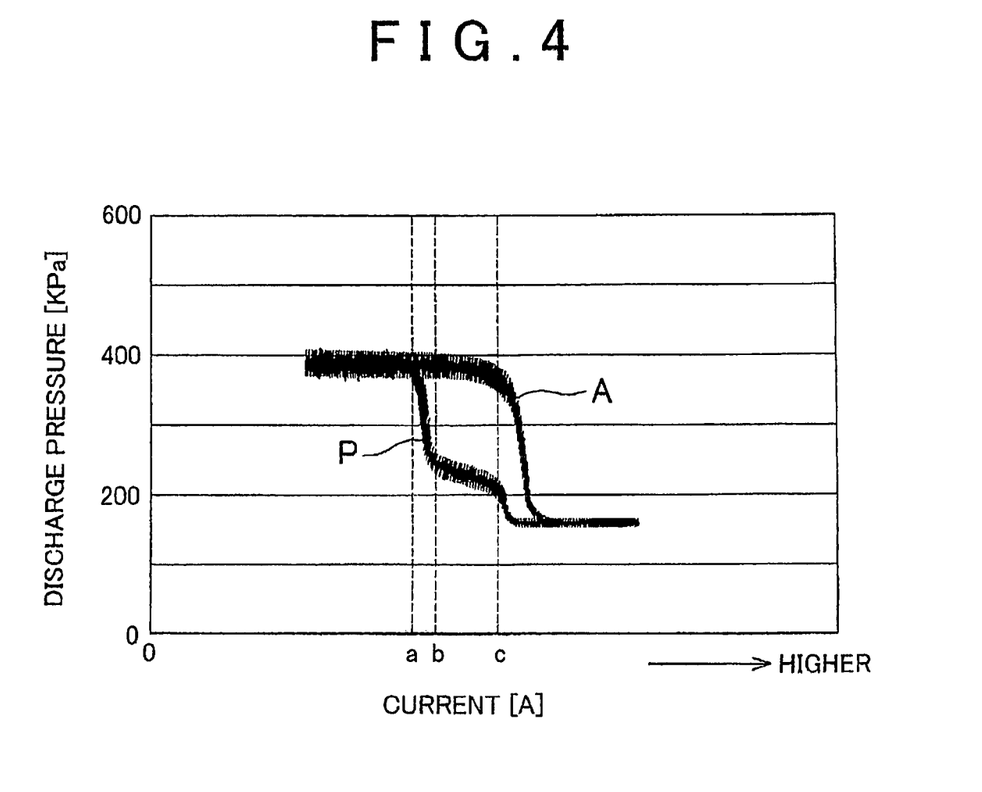
FIG. 4 is a graph for showing a result of an experiment in which a relation between drive current to an OCV and pump discharge pressure is investigated.

FIG. 4 shows an example of a result of an experiment in which a relation between drive current of the OCV 60 and the discharge pressure of the oil pump 5 is investigated and in which the rotational speed of the pump is nearly constant. As shown in the graph, the pump discharge pressure is maintained at about 400 kPa until the drive current of the OCV 60 reaches a predetermined value aA. In other words, the control oil pressure that is supplied to the control space TC is not substantially increased, and the pump capacity is not changed.

If the drive current is increased from the state described above, the control oil pressure from the OCV 60 to the control space TC is increased, and the force to assist in displacing the adjustment ring 53 is also increased as described above. At this time, as one example is shown by a solid line P in the graph, a phenomenon that the pump discharge pressure is abruptly reduced during a slight increase in the drive current (a to bA in the example of the drawing) occurs. After the phenomenon, the discharge pressure is gradually reduced until the drive current is increased to cA, and is stabilized at about 150 kPa.

As described above, the pump discharge pressure is not changed linearly with respect to the change in the drive current of the OCV 60, and is changed abruptly at a certain point. In addition, because a current value at which such an abrupt change occurs is not constant, and a magnitude of change in the discharge pressure fluctuates, the discharge pressure cannot be controlled with high accuracy. In other words, in reality, the accuracy of the displacement control of the oil pump 5 is not so high despite the electronic control of the OCV 60.

As a result of experiments and earnest investigations into a cause of such an abrupt change in the discharge pressure, the inventors have found that the oil leaked from the adjacent high-pressure space TH, the operation chambers R, or the like enters the control space TC to which the control oil pressure is supplied and that the oil pressure of the control space TC is abruptly changed under this influence. Based on this, the inventors provided a small hole (hereinafter referred to as an oil release hole 62) for suitably leaking the oil from the control space TC in the housing 50 to suppress the abrupt change in the oil pressure.

More specifically, as shown in FIGS. 2 and 3, the oil release hole 62 of this embodiment is opened to face the control space TC, extends upward in each of the drawings, and penetrates the wall section of the housing 50 to reach an outer surface thereof. In one example, the oil release hole 62 is drilled, and a diameter thereof is about 1 to 3 mm, for example. It should be noted that a dimension of the oil release hole 62 is adjusted by an experiment or a simulation, for example, such that an amount of the oil leaked therefrom is substantially the same as the amount of the oil that enters the control space TC when the pump discharge pressure is in a predetermined range.

Figure 5:
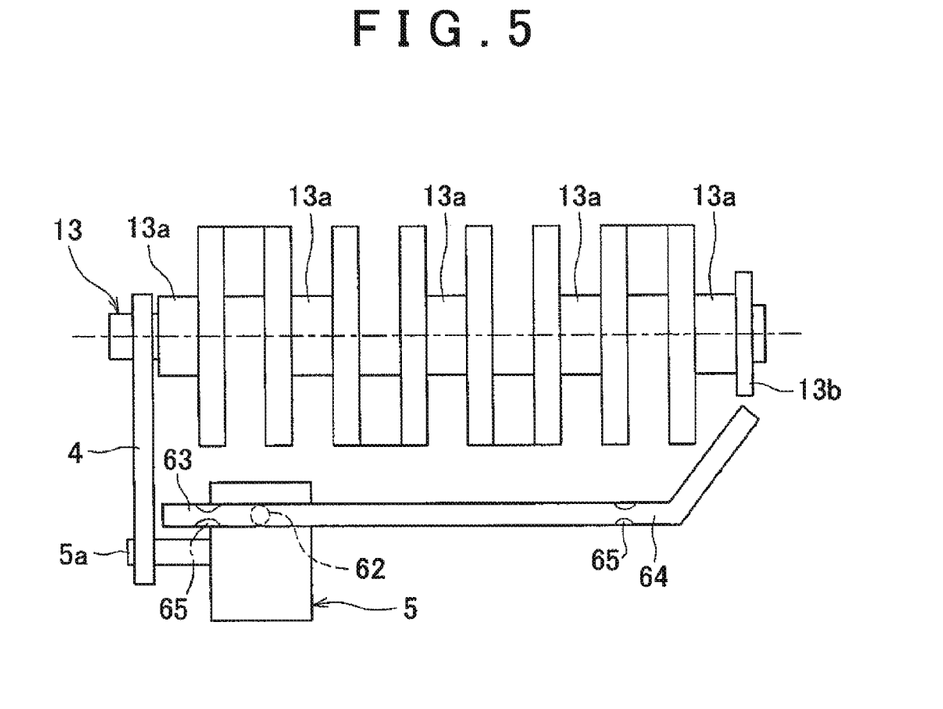
FIG. 5 is a view for schematically illustrating an oil leading pipe that leads leaked oil to a lubricated section of the engine.

As schematically shown in FIG. 5, oil leading pipes 63, 64 are connected to the oil release hole 62 in this embodiment. Accordingly, the oil that is leaked from the control space TC as described above flows through an oil passage (oil leading passage) in the oil leading pipes 63, 64 and is supplied to any of the lubricated sections in the engine 1 (in the example of the drawing, the chain 4 wound around the pump sprocket 5b and an oil seal 13b at a rear end of the crankshaft 13).

It should be noted that only one of the oil leading pipes 63, 64 may be provided or that the three or more oil leading pipes may be provided to supply the oil to the other lubricated sections. In addition, if a throttle section 65 is provided in the middle of the oil leading pipes 63, 64 to adjust the flow rate of the oil, the influence of a variation in the size of the oil release hole 62 can be reduced, and thus the oil leaked from the control space TC can be set in a favorable amount as described above.

As it has been described so far, in the variable displacement oil pump 5 according to this embodiment, the control oil pressure is applied to the adjustment ring 53, the oil release hole 62 is opened to the control space TC that generates the force to assist in displacing the adjustment ring 53, and the oil is suitably leaked from the oil release hole 62. Accordingly, it is possible to reduce the influence of the oil that enters the control space TC from the high-pressure space TH, for example, to suppress an abrupt operation of the adjustment ring 53 that is caused by the abrupt change in the oil pressure of the control space TC, and to improve the controllability of the discharge amount and the discharge pressure of the oil pump 5.

In other words, as shown by a solid line A in FIG. 4, the pump discharge pressure is kept at about 400 kPa until the drive current of the OCV 60 reaches cA. Then, if the drive current is further increased, the discharge pressure is linearly reduced at a substantially constant rate with respect to the increase in the drive current. Thus, the abrupt change in the discharge pressure that is shown by the solid line P in the same graph does not occur. Accordingly, it is possible to control the discharge pressure of the oil pump 5 with high accuracy by controlling the drive current of the OCV 60. This improves the controllability of the oil pressure in the main gallery 20 of the engine 1, and favorable lubrication performance of the engine 1 can be maintained by stably keeping the oil pressure.

In addition, an internal gear pump is used as the oil pump 5 in this embodiment. The high-pressure space TH is provided adjacent to the control space TC in the housing 50, and the second seal member 58 therebetween moves along the inner surface of the wall section of the housing 50 along with the displacement of the adjustment ring 53. Because the oil can easily enter the control space TC in such a structure, an effect to suppress the fluctuation in the oil pressure by partially leaking the oil as described above is particularly beneficial.

Furthermore, as described above with reference to FIG. 5, because the oil leaked from the control space TC through the oil release hole 62 is supplied to the lubricated sections such as the chain 4 by the oil leading pipes 63, 64 in this embodiment, the leaked oil can be used effectively.

Next, a description will be made on the structure of the oil pump 5 according to a second embodiment. Because the structure of the oil pump 5 in this embodiment differs from that in the first embodiment in a point that the oil release hole 62 has a different shape, a description will only be made on the oil release hole 62. The same components as those in the first embodiment are denoted by the same reference numerals, and the description thereof is not repeated. In addition, because the oil release hole 62 only differs in its shape, it is denoted by the same reference numeral.

Figure 6:
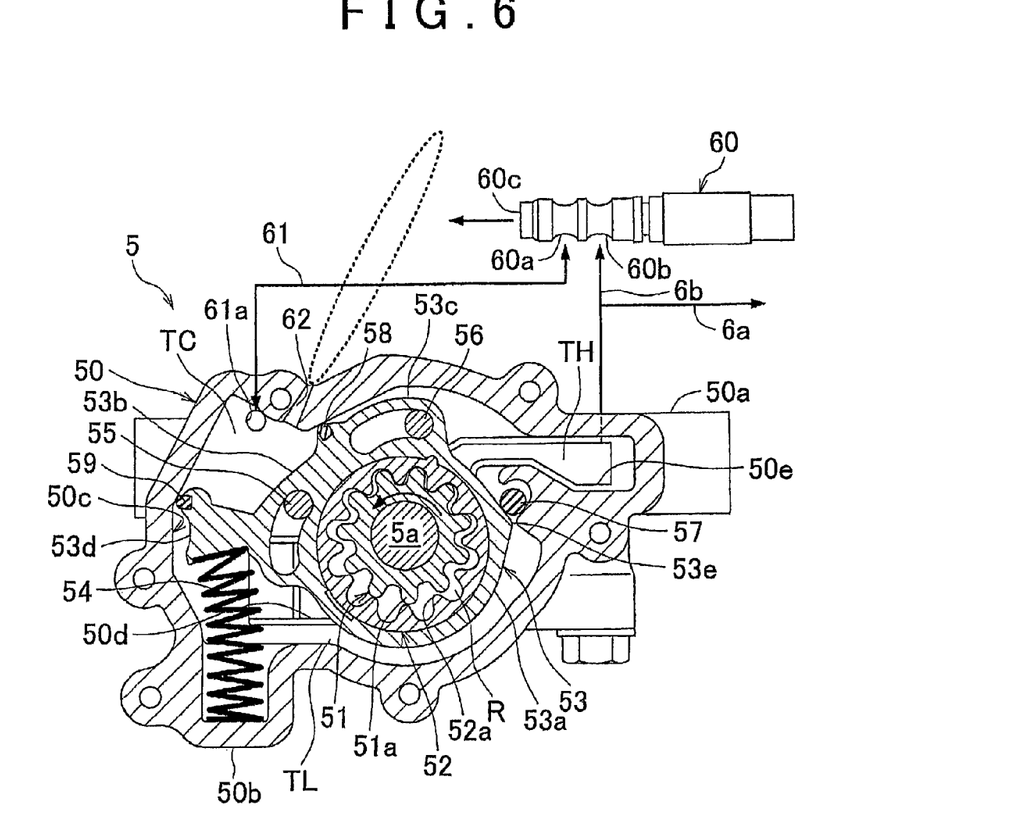
FIG. 6 is a view that corresponds to FIG. 3 according to a second embodiment.

FIG. 6 is a cross-sectional view for showing the structure of the oil pump 5 of this embodiment and shows a state of the maximum capacity as in FIG. 2. In this example, although not shown in FIG. 6, the oil release hole 62 is formed to extend toward the chain 4 and has a tapered shape whose cross section gradually decreases as separating from an opening end that faces the control space TC. It should be noted that the oil leading pipes 63, 64 are not connected to the oil release hole 62.

As schematically shown by a broken line in FIG. 6, it is possible to spray the oil intensively to the chain 4 from the oil release hole 62 because of the tapered shape as described above. In addition, removal of the oil leading pipes 63, 64 can provide benefits of weight and cost reductions.

Next, a description will be made on the structure of the oil pump 5 according to a third embodiment. Like the above embodiment, because the oil pump 5 of this embodiment only differs from that of the first and second embodiments in a point that the oil release hole 62 has a different shape, a description will only be made on the oil release hole 62, and the description of the other components will not be repeated.

Figure 7:
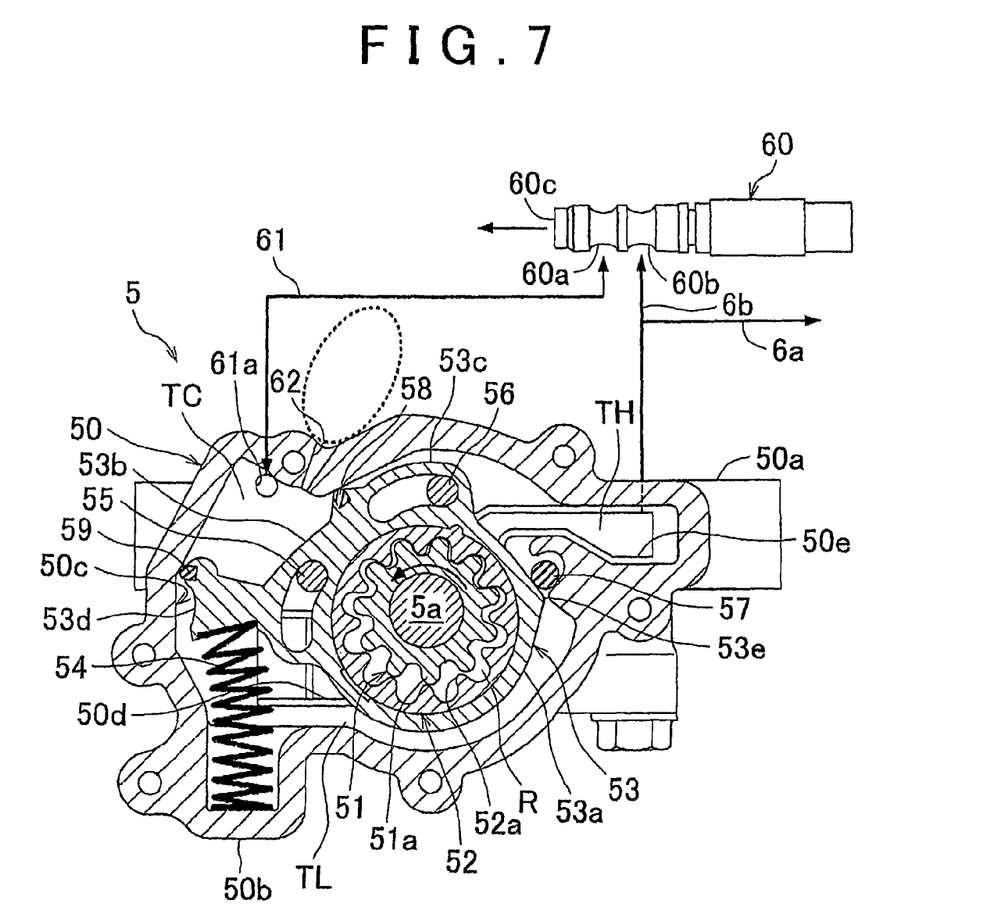
FIG. 7 is a view that corresponds to FIG. 3 according to a third embodiment.

FIG. 7 is a cross-sectional view for showing the structure of the oil pump 5 of this embodiment and shows a state of the maximum capacity as in FIGS. 2 and 6. In this example, the oil release hole 62 has an upwardly widened shape whose cross section gradually increases as separating from the opening end that faces the control space TC. It should be noted that the oil leading pipes 63, 64 are not connected to the oil release hole 62.

As schematically shown by a broken line in FIG. 7, the oil from the oil release hole 62 in the upwardly widened shape as described above is splashed in a relatively wide range and supplied to the plural lubricated sections (not only the chain 4 but also the pump sprocket 5*b* and the like, for example) in proximity of the oil pump 5. In addition, the removal of the oil leading pipes 63, 64 can provide the benefits of weight and cost reductions.

Although the description has been made so far on a case where the present invention is adopted as the oil pump 5 of the in-line four-cylinder gasoline engine 1 for an automobile, the present invention is not limited thereto and can also be adopted for an oil pump of an engine for machinery other than an automobile. Needless to say, the present invention is not limited by the number of cylinder or the type of engine (such as a V type or a horizontally opposed type) and thus can be adopted for an oil pump of a diesel engine or for an oil pump in a transmission.

In addition, in each of the above embodiments, the control space TC is provided adjacent to the high-pressure space TH to which the pump discharge pressure is led in the housing 50 of the oil pump 5, and the second seal member 58 therebetween moves along the inner surface of the wall section of the housing 50 along with the displacement of the adjustment ring 53. However, the present invention is not limited to such a structure.

Furthermore, the variable displacement mechanism of the oil pump 5 in each of the above embodiments is not limited to that including the adjustment ring 53, the coil spring 54, and the like. Thus, various structures other than the above can be considered.

The present invention can improve the controllability of the discharge amount and the discharge pressure of the variable displacement oil pump that is installed in an engine or a transmission, and contributes to the maintenance of the favorable lubrication performance of the engine or the like. Therefore, the present invention is especially beneficial when adopted for an automobile engine, for example.

The invention claimed is:

1. A variable displacement oil pump comprising:
a variable displacement mechanism to change a discharge amount per rotation of an input shaft;
the variable displacement mechanism including a pump housing, an oil pressure chamber, and a capacity adjuster structure;
the pump housing having an oil release hole that is opened to face the oil pressure chamber and penetrates a wall section of the pump housing to partially release oil;
the oil pressure chamber being provided in the pump housing;
the capacity adjuster structure being displaced by oil pressure from the oil pressure chamber;
the capacity adjuster structure being operated when receiving control oil pressure that is supplied from a control valve to the oil pressure chamber; and
the oil release hole and a path through which the control oil pressure is supplied from the control valve to the oil pressure chamber are disposed at positions different from each other.

2. The variable displacement oil pump according to claim 1, further comprising:
a high-pressure space to which pump discharge pressure is led is provided adjacent to the oil pressure chamber in the pump housing, and
a seal between the high-pressure space and the oil pressure chamber moves along an inner surface of the wall section of the pump housing along with an operation of the variable displacement mechanism.

3. The variable displacement oil pump according to claim 1, further comprising:
a drive rotor including an outer gear, the outer gear being rotated by the input shaft; and a driven rotor including an inner gear, the inner gear being meshed with the drive rotor for rotation, wherein the capacity adjuster structure is an annular holder structure, the capacity adjuster structure to change the discharge amount by holding the driven rotor from a circumference in a rotatable manner, being displaced when receiving the control oil pressure supplied to the oil pressure chamber, and changing a relative position of the capacity adjuster structure with respect to a suction port and a discharge port in the pump housing.

4. The variable displacement oil pump according to claim 1, wherein the oil release hole has a tapered shape, and a cross section of the oil release hole gradually decreases while separating from an opening end that faces the oil pressure chamber.

5. The variable displacement oil pump according to claim 1, wherein the oil release hole has an upwardly widened shape, and a cross section of the oil release hole gradually increases while separating from an opening end that faces the oil pressure chamber.

6. An engine comprising:

a variable displacement oil pump including:

a variable displacement mechanism to change a discharge amount per rotation of an input shaft;

the variable displacement mechanism including a pump housing, an oil pressure chamber, and a capacity adjuster structure;

the pump housing having an oil release hole that is opened to face the oil pressure chamber and penetrates a wall section of the pump housing to partially release oil;

the oil pressure chamber being provided in the pump housing;

the capacity adjuster structure being displaced by oil pressure from the oil pressure chamber;

the capacity adjuster structure being operated when receiving control oil pressure that is supplied from a control valve to the oil pressure chamber; and the oil release hole and a path through which the control oil pressure is supplied from the control valve to the oil pressure chamber are disposed at positions different from each other; and oil leading passages configured to lead the oil to at least one of a crank journal, a cam journal, a chain to drive the oil pump, an oil pump sprocket, and an oil seal on a crankshaft, in the engine, the oil leading passages being communicated with the oil release hole.

7. The engine according to claim 6, wherein a throttle section is provided in a middle of the oil leading passages.

8. The engine according to claim 6, wherein the oil release hole is configured such that the oil from the oil release hole is supplied to the crank journal or the cam journal.

9. The engine according to claim 6, wherein a lubricated section is the chain to drive the oil pump.

10. The engine according to claim 6, wherein a lubricated section is the oil pump sprocket.

\* \* \* \* \*